(12) United States Patent
Kim et al.

(10) Patent No.: US 9,607,141 B2
(45) Date of Patent: Mar. 28, 2017

(54) MOBILE TERMINAL AND CONTROL METHOD THEREOF

(71) Applicant: LG ELECTRONICS INC., Seoul (KR)

(72) Inventors: Kanguk Kim, Seoul (KR); Taiyoung Choi, Seoul (KR); Keumsung Hwang, Seoul (KR); Byonggyo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/053,915

(22) Filed: Feb. 25, 2016

(65) Prior Publication Data

US 2016/0179278 A1    Jun. 23, 2016

Related U.S. Application Data

(63) Continuation of application No. 13/708,904, filed on Dec. 7, 2012.

(30) Foreign Application Priority Data

Dec. 8, 2011    (KR) .................... 10-2011-0130666

(51) Int. Cl.
| | | |
|---|---|---|
| *G06F 3/041* | (2006.01) | |
| *H04W 12/08* | (2009.01) | |
| *H04M 1/66* | (2006.01) | |
| *G06F 21/36* | (2013.01) | |
| *H04L 29/06* | (2006.01) | |
| *G06F 1/32* | (2006.01) | |
| *G06F 3/0488* | (2013.01) | |

(Continued)

(52) U.S. Cl.
CPC ............ *G06F 21/36* (2013.01); *G06F 1/3203* (2013.01); *G06F 3/044* (2013.01); *G06F 3/0416* (2013.01); *G06F 3/04883* (2013.01); *H04L 63/108* (2013.01); *H04W 12/06* (2013.01); *H04W 88/02* (2013.01)

(58) Field of Classification Search
CPC ........ G06F 21/32; G06F 21/36; G06F 1/3203; G06F 3/04883; G06F 3/04845; H04W 12/06; H04W 88/02; H04L 9/32; H04L 63/108
USPC ........ 345/156, 173, 419, 660, 672; 455/411; 715/863, 799
See application file for complete search history.

(56) References Cited

U.S. PATENT DOCUMENTS 7,593,000 B1 *    9/2009    Chin ..................... G06F 21/32
345/156
8,209,630 B2 *    6/2012    Thimbleby ......... G06F 3/04845
345/660

(Continued)

OTHER PUBLICATIONS

United States Patent and Trademark Office U.S. Appl. No. 15/053,902, Office Action dated Aug. 19, 2016, 23 pages.

*Primary Examiner* — Jin-Cheng Wang
(74) *Attorney, Agent, or Firm* — Lee Hong Degerman Kang & Waimey

(57) ABSTRACT

The present invention relates to a mobile terminal and a control method thereof. The mobile terminal displays a plurality of figures arranged in a first composition on a touch screen when a specific mode is locked, rearranges the plurality of figures in a second composition different from the first composition upon receiving a specific input, and determines whether to unlock the specific mode on the basis of a pattern which is input using the plurality of figures arranged in the first or second composition.

10 Claims, 19 Drawing Sheets

(51) Int. Cl.
*H04W 12/06* (2009.01)
*H04W 88/02* (2009.01)
*G06F 3/044* (2006.01)

(56) References Cited

U.S. PATENT DOCUMENTS

| | | | |
|---|---|---|---|
| 8,381,125 B2* | 2/2013 | Leffert | G06F 3/04845 345/660 |
| 8,588,739 B2* | 11/2013 | Kawabata | G06F 3/04883 455/410 |
| 8,904,479 B1* | 12/2014 | Johansson | G06F 21/36 382/181 |
| 2008/0083015 A1* | 4/2008 | Kim | G06F 21/36 726/2 |
| 2009/0259967 A1* | 10/2009 | Davidson | G06F 3/0481 715/799 |
| 2009/0289916 A1* | 11/2009 | Dai | G06F 3/04883 345/173 |
| 2010/0117973 A1* | 5/2010 | Chiang | G06F 3/0482 345/173 |
| 2011/0041102 A1* | 2/2011 | Kim | G06F 3/04883 715/863 |
| 2011/0187497 A1* | 8/2011 | Chin | H04L 9/32 340/5.54 |
| 2011/0202853 A1 | 8/2011 | Mujkic | |
| 2011/0294467 A1* | 12/2011 | Kim | G06F 1/1643 455/411 |
| 2011/0300831 A1* | 12/2011 | Chin | G06F 1/3203 455/411 |
| 2012/0050009 A1* | 3/2012 | Hsieh | G06F 21/36 340/5.51 |
| 2012/0062764 A1 | 3/2012 | Shinozawa et al. | |
| 2012/0113007 A1* | 5/2012 | Koch | G06F 3/0488 345/168 |
| 2012/0117506 A1* | 5/2012 | Koch | G06F 3/04886 715/773 |
| 2012/0125442 A1 | 5/2012 | Sutherland et al. | |
| 2012/0162261 A1* | 6/2012 | Kim | G06F 3/017 345/647 |
| 2012/0252410 A1* | 10/2012 | Williams | G06F 21/36 455/411 |
| 2013/0017846 A1 | 1/2013 | Schoppe | |
| 2013/0065517 A1* | 3/2013 | Svensson | H04W 12/00 455/39 |
| 2013/0100030 A1 | 4/2013 | Los et al. | |
| 2013/0159936 A1* | 6/2013 | Yamaguchi | G06F 3/0485 715/850 |
| 2013/0233689 A1 | 9/2013 | Ng | |

* cited by examiner

MOBILE TERMINAL AND CONTROL METHOD THEREOF

CROSS-REFERENCE TO RELATED APPLICATIONS

This application is a continuation of U.S. application Ser. No. 13/708,904, filed on Dec. 7, 2012, now U.S. Pat. No. 9,390,250, which claims the benefit of earlier filing date and right of priority to Korean Patent Application No. 10-2011-0130666, filed on Dec. 8, 2011, the contents of which are all hereby incorporated by reference herein in their entirety.

TECHNICAL FIELD

The present invention relates to a mobile terminal and a control method thereof.

DISCUSSION OF THE RELATED ART

Terminals can be classified into a mobile terminal and a stationary terminal according to mobility. The mobile terminal can be divided into a handheld terminal and a vehicle mount terminal according to portability of users.

With increasing propagation of a mobile terminal including a touch screen, various methods for locking/unlocking a touch screen are proposed.

Among the methods, a method of unlocking the touch screen using an unlocking pattern displays points through which a pattern can be input on a screen and determines whether to unlock the touch screen by comparing a pattern formed by touching points displayed on the screen with a previously registered unlocking pattern.

SUMMARY

An object of the present invention is to provide a mobile terminal and a control method thereof to improve user convenience and provide a user-friendly unlocking method.

According to one aspect of the present invention, there is provided a mobile terminal including: a touch screen; a memory configured to store an unlocking pattern for a specific mode; and a controller configured to display a plurality of figures arranged in a first composition on the touch screen when the specific mode is locked, to rearrange the plurality of figures in a second composition different from the first composition upon receiving a specific input, and to determine whether to unlock the specific mode on the basis of a pattern which is input using the plurality of figures arranged in the first or second composition.

According to another aspect of the present invention, there is provided a mobile terminal including: a touch screen including a panel for generating stereoscopic vision; a memory configured to store an unlocking pattern for a specific mode; and a controller configured to display a plurality of figures as stereoscopic objects when the specific mode is locked, to receive a pattern on the basis of the depths of the plurality of stereoscopic objects, and to unlock the specific mode when the received pattern corresponds to the unlocking pattern.

According to another aspect of the present invention, there is provided a method of controlling a mobile terminal, including: displaying a plurality of figures for receiving an unlocking pattern for a specific mode in a first area; displaying the plurality of figures in a second area different from the first area upon receiving a specific input; receiving a pattern corresponding to a trajectory generated by at least one touched figure from the plurality of figures or the order of touching figures; and entering the specific mode when the received pattern corresponds to the unlocking pattern.

The mobile terminal and control method thereof according to the present invention can improve user convenience and provide a user-friendly unlocking method.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
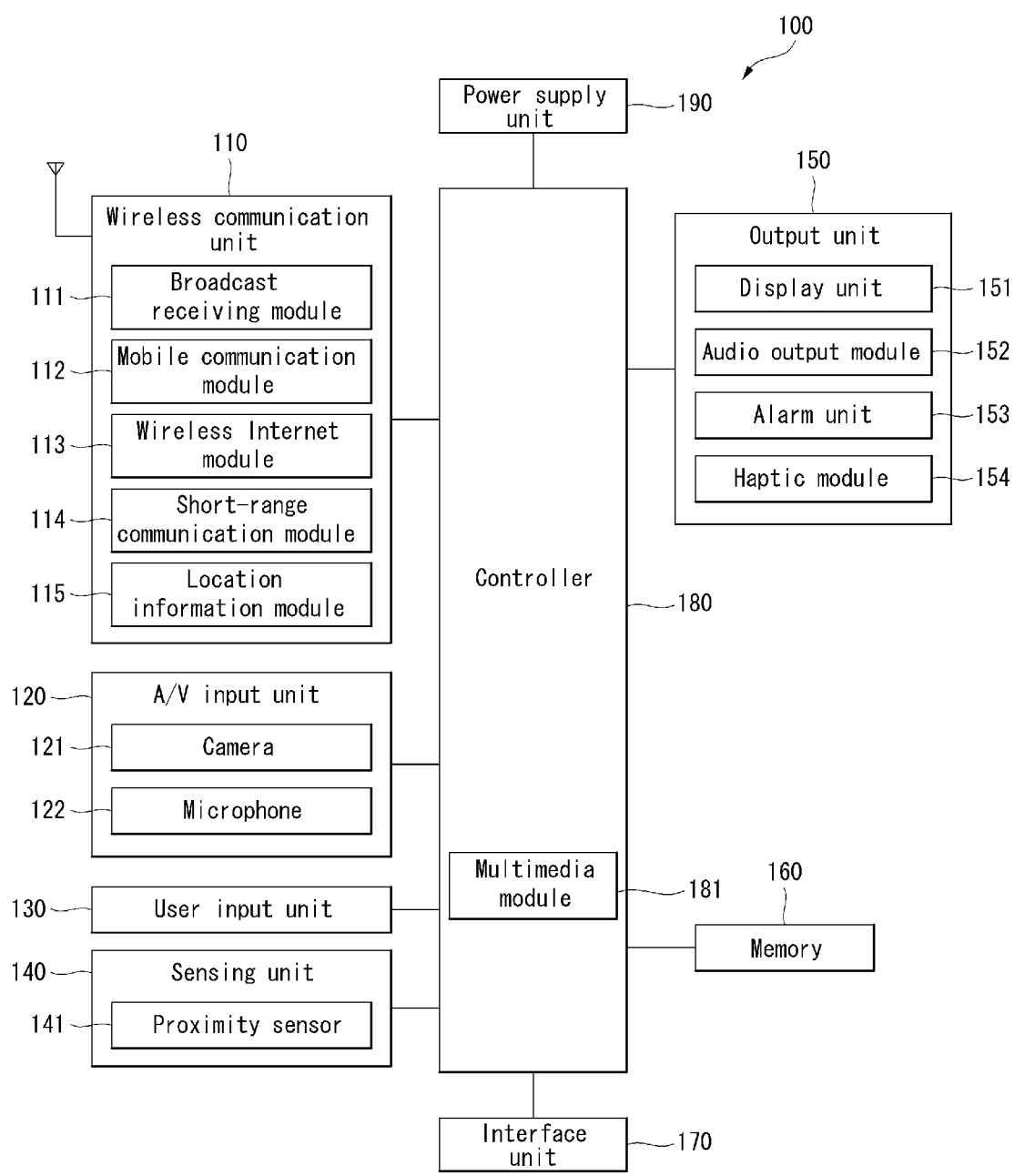
FIG. 1 is a block diagram of a mobile terminal according to an embodiment of the present invention.

FIG. 1 is a block diagram of a mobile terminal according to an embodiment of the present invention. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display unit 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether The interface unit 170 is connected to an external device. The sensing unit 140 may also include a proximity sensor 141. The sensing unit 140 may sense a motion of the mobile terminal 100.

The output unit 150 may generate visual, auditory and/or tactile output, and the output unit 150 may include the display unit 151, an audio output module 152, an alarm unit 153 and a haptic module 154. The display unit 151 may display information processed by the mobile terminal 100. The display unit 151 may display a user interface (UI) and/or a graphic user interface (GUI) related to a telephone call when the mobile terminal 100 is in the call mode. The display unit 151 may also display a captured and/or received image, a UI or a GUI when the mobile terminal 100 is in the video telephony mode or the photographing mode.

The display unit 151 may include at least one of a liquid crystal display, a thin film transistor liquid crystal display, an organic light-emitting diode display, a flexible display and/or a three-dimensional display. The display unit 151 may be of a transparent type or a light transmissive type. That is, The display unit 151 may include a transparent display.

The transparent display may be a transparent liquid crystal display. A rear structure of The display unit 151 may also be of a light transmissive type. Accordingly, a user may see an object located behind the body (of the mobile terminal 100) through the transparent area of the body of the mobile terminal 100 that is occupied by The display unit 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When The display unit 151 and a sensor sensing touch (hereafter referred to as a touch sensor) form a layered structure that is referred to as a touch screen, The display unit 151 may be used as an input device in addition to an output device. The touch sensor may be in the form of a touch film, a touch sheet, and/or a touch pad, for example.

The touch sensor may convert a variation in pressure applied to a specific portion of The display unit 151 or a variation in capacitance generated at a specific portion of The display unit 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of The display unit 151.

The proximity sensor 141 (of the sensing unit 140) may be located in an internal region of the mobile terminal 100, surrounded by the touch screen, and/or near the touch screen. The proximity sensor 141 may sense an object approaching a predetermined sensing face or an object located near the proximity sensor 141 using an electromagnetic force or infrared rays without having mechanical contact. The proximity sensor 141 may have a lifetime longer than a contact sensor and may thus have a wide application in the mobile terminal 100.

The proximity sensor 141 may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor 141.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm unit 153 may output a signal for indicating generation of an event of the mobile terminal 100. For example, an alarm may be generated when receiving a call signal, receiving a message, inputting a key signal, and/or inputting a touch. The alarm unit 153 may also output signals in forms different from video signals or audio signals, for example, a signal for indicating generation of an event through vibration. The video signals and/or the audio signals may also be output through The display unit 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface unit 170 may serve as a path to external devices connected to the mobile terminal 100. The interface unit 170 may receive data from the external devices or power and transmit the data or power to internal components of the mobile terminal 100 or transmit data of the mobile terminal 100 to the external devices. For example, The interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of The interface unit 170.

The interface unit 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Figure 2:
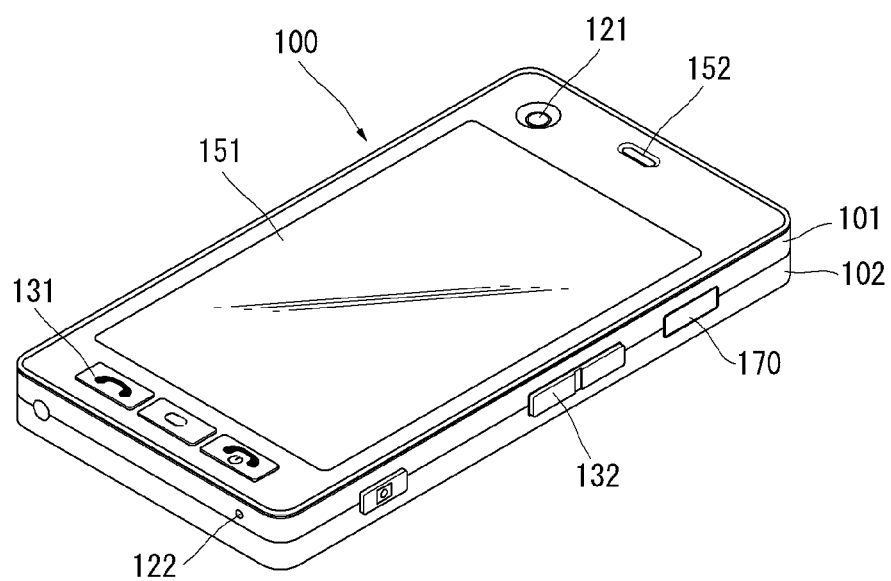
FIG. 2 is a perspective view of the mobile terminal shown in FIG. 1.

FIG. 2 is a front perspective view of a mobile terminal or a handheld terminal 100 according to an example embodiment of the present invention. The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102. The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface unit 170 can be arranged in the terminal body, specifically, in the front case 101. The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and The interface unit 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling. First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 3:
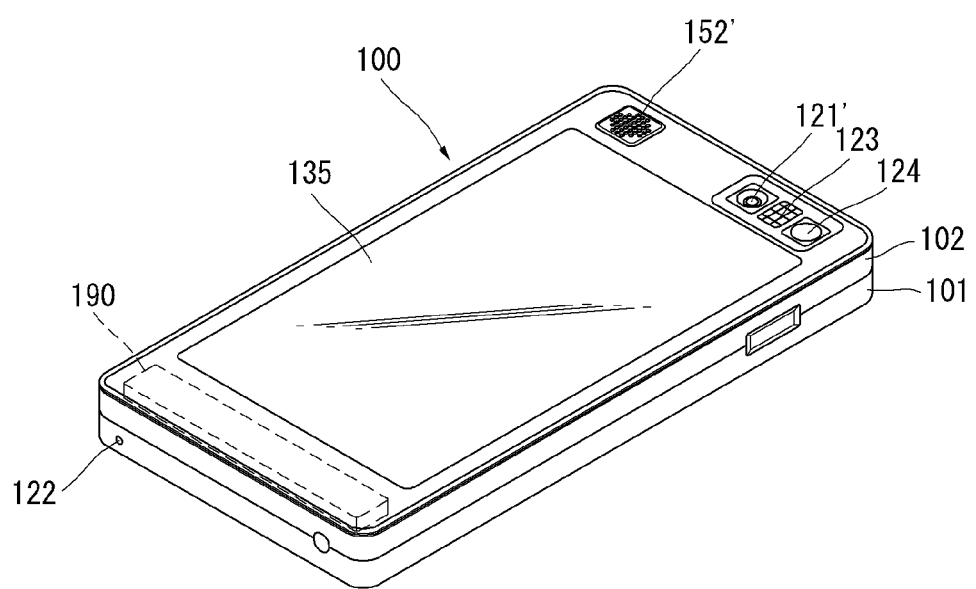
FIGS. 3 and 4 illustrate operations of a touch pad of the mobile terminal shown in FIG. 2.

FIG. 3 is a rear perspective view of the handheld terminal shown in FIG. 2 according to an embodiment of the present invention.

Referring to FIG. 3, a camera 121' can be additionally attached to the rear side of the terminal body, that is, the rear case 102. The camera 121' has a photographing direction opposite to that of the camera 121 shown in FIG. 2 and can have pixels different from those of the camera 121 shown in FIG. 2.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2 and be used for a speaker phone mode when the terminal is used for a telephone call.

A broadcasting signal receiving antenna can be additionally attached to the side of the terminal body in addition to an antenna for telephone calls. The antenna constructing a part of the broadcasting receiving module 111 shown in FIG. 1 can be set in the terminal body such that the antenna 124 can be pulled out of the terminal body. The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Figure 4:
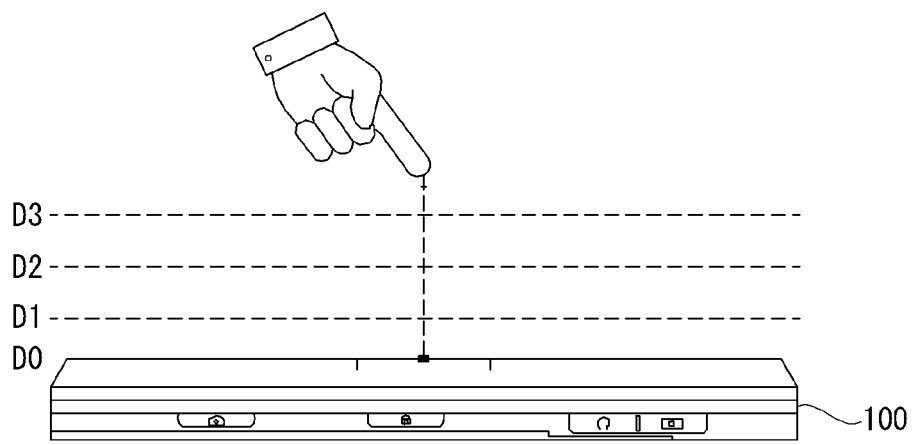

Next, FIG. 4. is a conceptual view illustrating a proximity depth of the proximity sensor 141. As shown in FIG. 4, when a pointer such as the user's finger, a pen, or the like, approaches the touch screen, the proximity sensor 141 disposed within or near the touch screen detects it and outputs a proximity signal. The proximity sensor 141 may also be configured to output a different proximity signal according to the distance (referred to as a 'proximity depth', hereinafter) between the closely touched pointer and the touch screen.

FIG. 4. also shows the section of the touch screen with the proximity sensor 141 for detecting, for example, three proximity depths. The proximity sensor 141 may detect three or less or four or more proximity depths. In more detail, when the pointer is fully brought into contact with the touch screen d0, this position is recognized as a contact touch. When the pointer is positioned to be spaced apart by shorter than a distance d1 on the touch screen, this position is recognized as a proximity touch with a first proximity depth.

If the pointer is positioned to be spaced apart by the distance longer than the distance d1 but shorter than a distance d2 on the touch screen, this position is recognized as a proximity touch with a second proximity depth. Also, if the pointer is positioned to be spaced apart by the distance longer than the distance d2 but shorter than a distance d3, this position is recognized as a proximity touch with a third proximity depth. If the pointer is positioned to be spaced apart by longer than the distance d3 on the touch screen, this position is recognized that the proximity touch has been released.

Accordingly, the controller 180 can recognize the proximity touches as various input signals according to the proximity depths and proximity positions of the pointer, and control various operations according to the various input signals.

Figure 5:
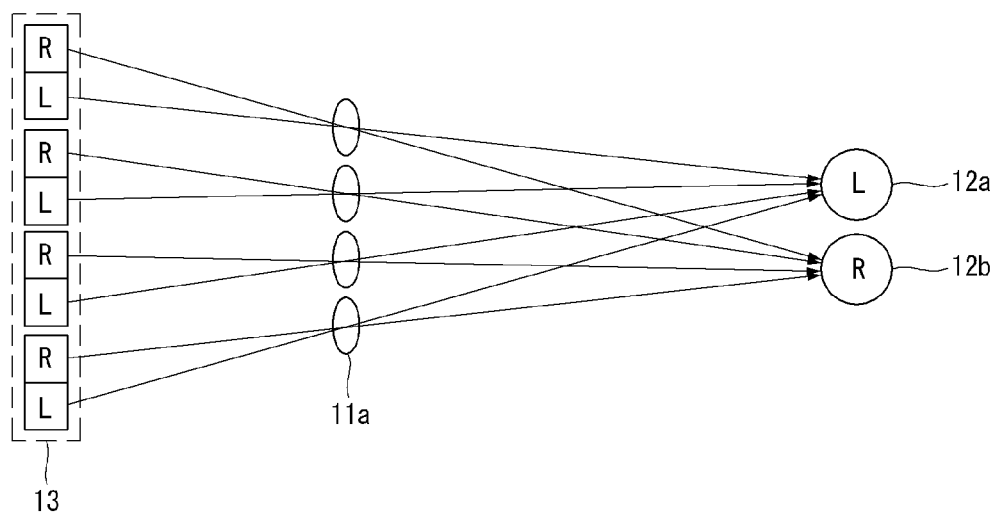
FIGS. 5 and 6 are views for explaining a method of displaying a stereoscopic image using binocular parallax according to embodiments of the present invention.
Figure 6:
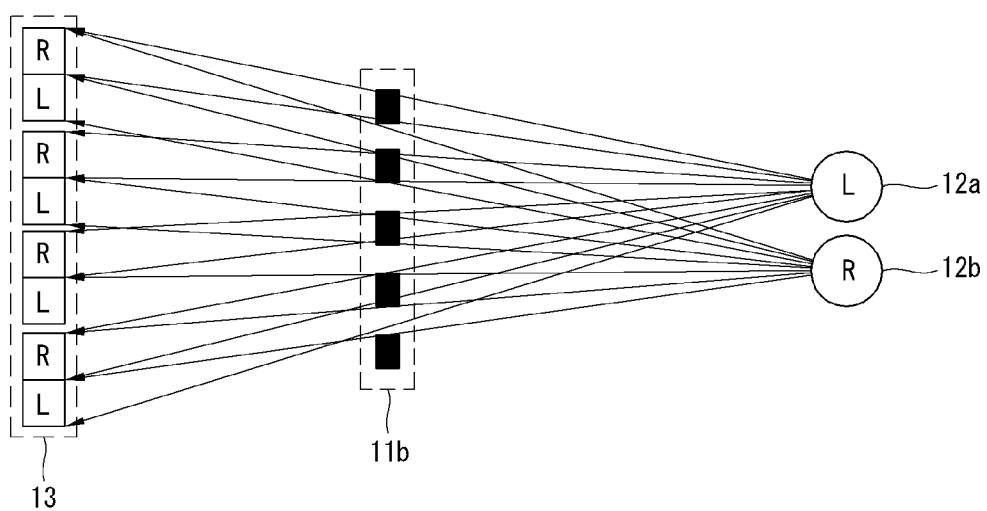

FIGS. 5 and 6 are views for explaining a method of displaying a stereoscopic image using binocular parallax according to embodiments of the present invention. FIG. 5 illustrates a method using a lenticular lens array and FIG. 6 illustrates a method using a parallax barrier.

Binocular parallax refers to the apparent difference in position of an object as seen separately by one eye, and then by the other. When the brain of a person combines an image viewed through the left eye and an image viewed through the right eye, the combined image is seen as a stereoscopic image by the person.

In the following description, the phenomenon that a person feels stereoscopic effect according to binocular parallax is called 'stereoscopic vision' and an image that generates stereoscopic vision is called 'stereoscopic image'. The stereoscopic image can use a moving image or a still image.

An object included in a stereoscopic image is referred to as 'stereoscopic object' and content generated such that it causes stereoscopic vision is referred to as 'stereoscopic content'. The stereoscopic content may include a stereoscopic image, a stereoscopic object, etc.

Methods of displaying a stereoscopic image using the binocular parallax are classified into a stereoscopic method and an auto-stereoscopic method.

The stereoscopic method includes a method using shades having wavelength selectivity, a patterned retarder method using light-shielding effect according to polarization difference, and a field sequential glasses method that alternately provides left and right images within the afterimage lag time of eyes. In addition, there is a method that sets filters having difference transmittance for left and right eyes and obtains stereoscopic effect with respect to motion to the left and right according to a time difference of the visual system, caused by the transmittance difference.

The auto-stereoscopic method that causes stereoscopic effect at the side of an image display plane instead of an observer includes a method using a parallax barrier, a method using a lenticular lens, a method using a microlens array, etc.

Referring to FIG. 5, the display unit 151 includes a lenticular lens array 11a in order to display a stereoscopic image. The lenticular lens array 11a is located between a display plane 13 on which a pixel L to be viewed by the left eye 12a and a pixel R to be viewed by the right eye 12b are alternately arranged in the horizontal direction and the left and right eyes 12a and 12b and provides optical discrimination directivity for the pixel L and the pixel R. Accordingly, an image that has passed through the lenticular lens array 11a is divided and observed by the left eye 12a and the right eye 12b, and the human brain combines the image viewed through the left eye 12a and the image viewed through the right eye 12b so as to see a stereoscopic image.

Referring to FIG. 6, the display unit 151 includes a parallax barrier 11b in the form of a vertical lattice to display a stereoscopic image. The parallel barrier 11b is located between the display plane 13 on which the pixel L to be viewed by the left eye 12a and the pixel R to be viewed by the right eye 12b are alternately arranged in the horizontal direction and the left and right eyes 12a and 12b, and an image is divided at the left eye 12a and the right eye 12b through apertures in the form of a vertical lattice and viewed. Accordingly, the human brain combines then image viewed through the left eye 12a and the image viewed through the right eye 12b to see a stereoscopic image. The parallax barrier 11b is turned on only when a stereoscopic image is displayed to separate incidence views and turned off when a plane image is displayed to pass the incidence views without separating them.

The above stereoscopic image display methods merely describe the present invention and the present invention is not limited thereto. The present invention can display a stereoscopic image using binocular parallax through various methods in addition to the above-described methods.

Exemplary embodiments of the present invention will now be described.

The embodiments can be implemented in the mobile terminal 100 described with reference to FIGS. 1 to 4.

The display unit 151 may include a panel for generating stereoscopic vision. The panel can have a structure for generating stereoscopic vision through the method using a lenticular lens or the method using a parallax barrier, as described above.

It is assumed that the display unit 151 is a touch screen for convenience of description. As described above, the touch screen 151 can perform both the information display function and information input function, as described above. However, the present invention is not limited thereto.

In the specification, a touch gesture means a gesture corresponding to contact touch or proximity touch, and touch input means input received by a touch gesture.

Touch gestures are divided into tapping, drag, flicking, press, multi-touch, pinch-in, pinch-output, etc.

Tapping refers to a motion of slightly pressing the touch screen 151 and releasing the touch and corresponds to a touch gesture such as clicking of a mouse of a computer.

Drag is a motion of touching the touch screen 151, moving the touch to a specific point and releasing the touch. When an object is dragged, the object may be moved and displayed in the drag direction.

Flicking refers to a motion of touching the touch screen 151, moving the touch to a specific direction (up, down, left, right, or diagonal direction) and then releasing the touch. Upon reception of touch input by flicking, the mobile terminal 100 processes a specific operation on the basis of a flicking direction, speed, etc. For example, the mobile terminal 100 can perform an operation of turning over the pages of e-boom on the basis of a flicking direction.

Press refers to a motion of touching the touch screen 151 and then maintaining the touch for a predetermined time or longer.

Multi-touch refers to a motion of simultaneously touching a plurality of points of the touch screen 151.

Pinch-in refers to a motion of dragging a plurality of pointers that are multi-touching the touch screen 151 to a direction in which the pointers become close to one another. That is, pinch-in means drag started from at least one of the multi-touched points and generated in a direction in which the points become close to one another.

Pinch-out refers to a motion of dragging a plurality of pointers that are multi-touching the touch screen 151 to a direction in which the pointers become apart from one another. That is, pinch-out means drag started from at least one of multi-touched points and generated in a direction in which the points become apart from one another.

In the specification, the sensing unit 140 can obtain a rotation velocity or angular velocity according to rotation of the mobile terminal on an axis, that is, rotation of the mobile terminal 100 using a gyroscope. Furthermore, the sensing unit 140 can obtain acceleration of gravity according to movement of the mobile terminal 100 through an accelerometer. In addition, the sensing unit 140 can obtain the orientation of the mobile terminal 100 like a compass through a magnetic sensor.

The controller 180 can obtain a motion of the mobile terminal 100 on the basis of at least one of the angular velocity acquired through the gyroscope, the acceleration of gravity, acquired through accelerometer, and the orientation of the mobile terminal 100 acquired through the magnetic sensor. For example, when the mobile terminal 100 rotates on an axis that traverses the body of the mobile terminal 100 vertically or horizontally, the controller 180 can acquire a tilting state of the mobile terminal 100, which includes a tilting degree, tilting velocity, tilting direction, etc. of the body of the mobile terminal 100.

In the specification, motions of the mobile terminal 100 are defined as 'tilting', 'snapping', 'shaking', 'flicking', and 'tapping'.

Tilting and snapping mean a motion of tilting the mobile terminal 100 and may be discriminated from each other on the basis of a rotating velocity of the mobile terminal 100.

Tilting refers to a motion of tilting the mobile terminal 100 at lower than a predetermined velocity and snapping refers to a motion of tilting the mobile terminal 100 at higher than the predetermined velocity.

Shaking refers to a motion of consecutively snapping the mobile terminal 100 at least twice. Flicking refers to a motion of turning the mobile terminal 100. That is, flicking means a motion of changing the directions of the front side and the rear side of the mobile terminal 100.

Tapping refers to a motion of lightly tapping the surface of the mobile terminal 100. Tapping can be sensed through a gyroscope, a magnetic sensor, an accelerometer, etc. as well as a touch sensor.

A method of controlling the mobile terminal 100 according to a first embodiment of the invention and operations of the mobile terminal 100 to implement the control method will now be described in detail with reference to FIGS. 7 to 10.

Figure 7:
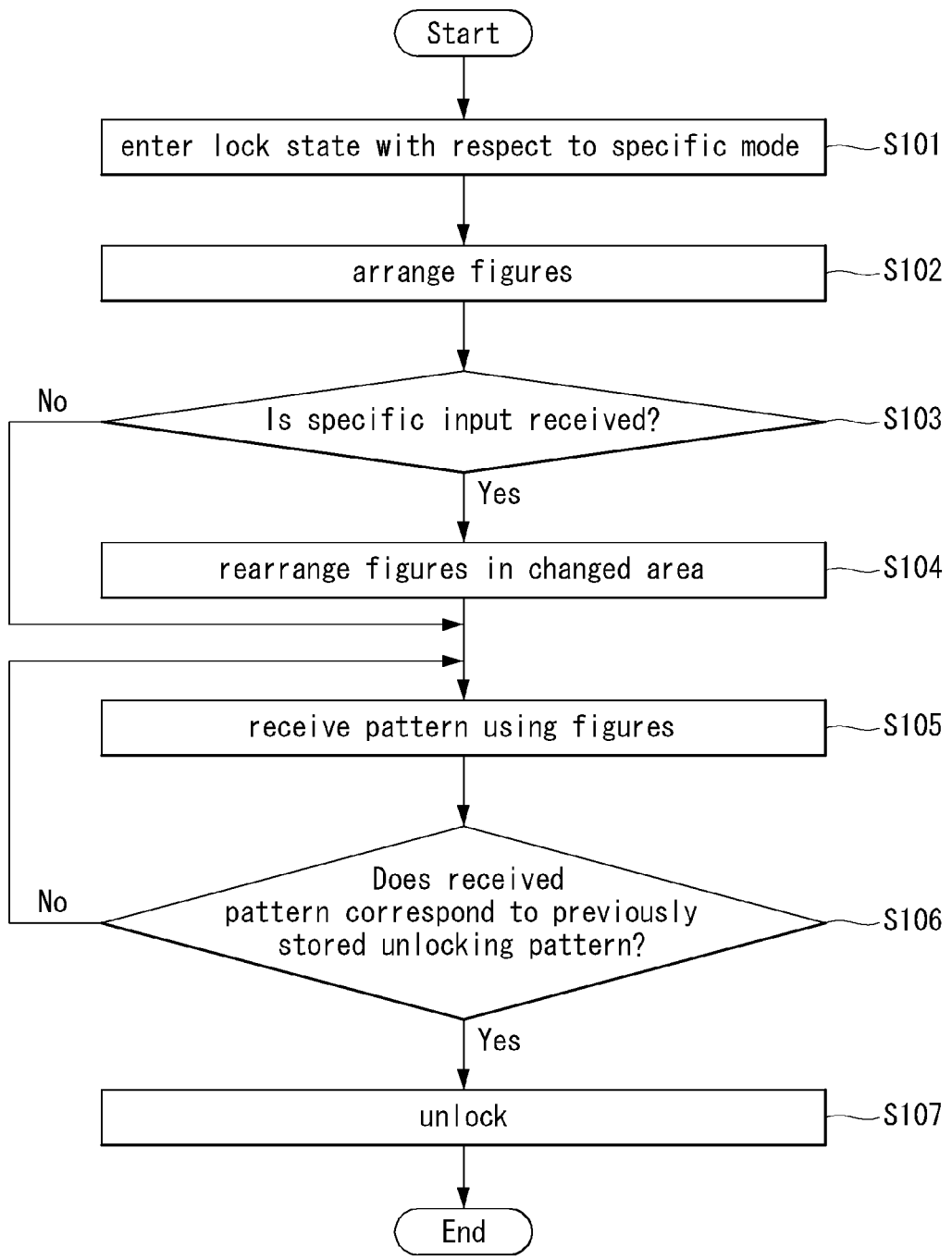
FIG. 7 is a flowchart illustrating a method of controlling a mobile terminal 100 according to a first embodiment of the present invention.
Figure 8:
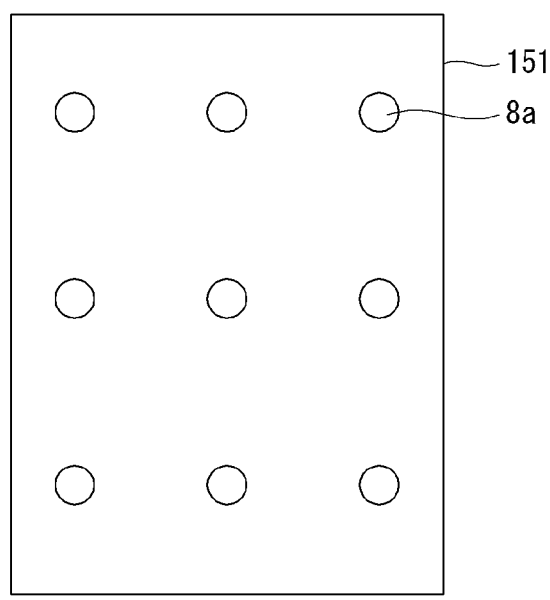
FIG. 8 shows an example of initially arranging figures through which an unlocking pattern is input in the mobile terminal 100 according to the first embodiment of the present invention.
Figure 9:
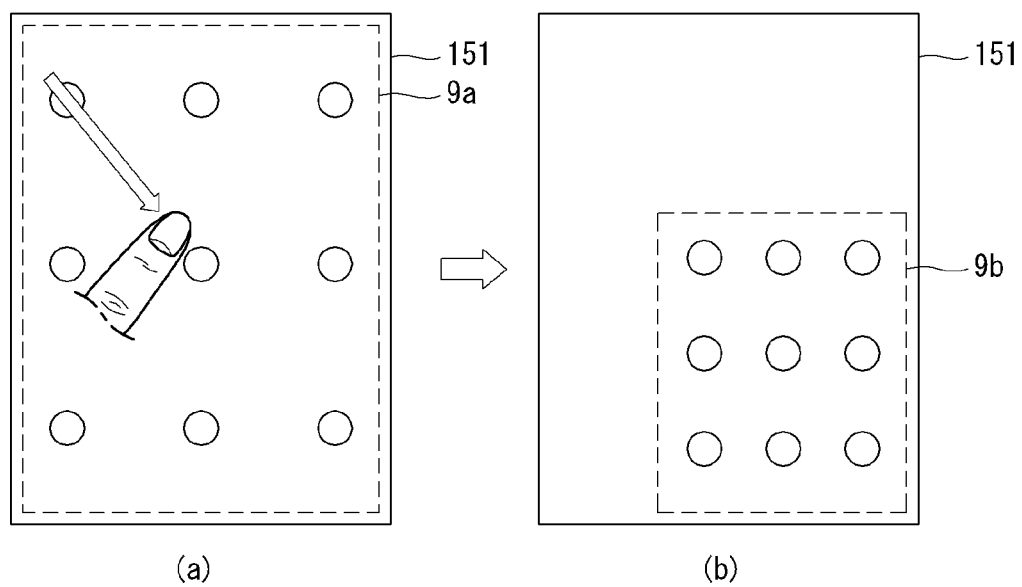
FIG. 9 shows an example of rearranging the figures in the mobile terminal according to the first embodiment of the present invention.

FIG. 7 is a flowchart illustrating the mobile terminal according to the first embodiment of the invention and FIGS. 8 and 9 are views for explaining the control method shown in FIG. 7.

Referring to FIG. 7, the controller 180 locks a specific mode of the mobile terminal 100 (S101).

For example, the specific mode may be a mode in which information or a command can be received from a user through a touch operation of the user via the touch screen 151. This mode can be called an activation mode. In the case of a terminal employing a touch screen, the touch screen is generally controlled to be locked to prevent an erroneous operation when the user does not manipulate the terminal for a predetermined time.

A case in which the specific mode is the activation mode of the touch screen 151 will now be described as an example. However, it is noted that the specific mode is not limited to the activation mode.

Upon reception of a control input for requesting the locked specific mode to be unlocked, the controller 180 arranges a plurality of figures for receiving an unlocking pattern on the touch screen (S102).

The unlocking pattern is used as authentication information for determining whether to unlock the specific mode and may be generated in the form of at least one trajectory that connect some of the plurality of figures or in the order of touching some of the plurality of figures.

When the plurality of figures for receiving the unlocking pattern is initially arranged in step S102, the plurality of figures may be arranged in a first area.

FIG. 8 shows an example of initially arranging the figures for receiving the unlocking pattern.

Referring to FIG. 8, the controller 180 can arrange FIGS. 8a as points at a predetermined interval on the same plane. The controller 180 evenly arranges the figures on the overall screen.

Referring back to FIG. 7, upon reception of a specific input while the figures for receiving the unlocking pattern are displayed (S103), the controller 180 changes the area in which the figures are displayed. That is, the controller 180 rearranges and displays the figures in the changed area (S104).

FIG. 9 shows an example of rearranging the figures.

Referring to FIG. 9(a), the controller displays the figures for receiving the unlocking pattern in a first area 9a.

When the user drags the first area 9a, the controller 180 re-sets an area in which the figures will be displayed on the basis of the direction and distance of the drag. That is, the controller 180 sets a second area 9b reduced from the first area 9a as the area in which the figures will be displayed and rearranges the figures in the second area 9b.

Referring back to FIG. 7, the controller 180 receives a pattern using the figures displayed on the screen (S105).

When the received pattern corresponds to a previously stored unlocking pattern (S106), the controller 180 unlocks the specific mode (S106). That is, the controller 180 controls the mobile terminal 100 to operate in the activation mode of the touch screen 151.

When the user inputs a pattern using the figures in step S105, the controller 180 can display the touched figures such that the touched figures are distinguished from other figures or display a trajectory formed by the touched figures on the screen to allow the user to intuitively recognize the pattern input by him/her.

Figure 10:
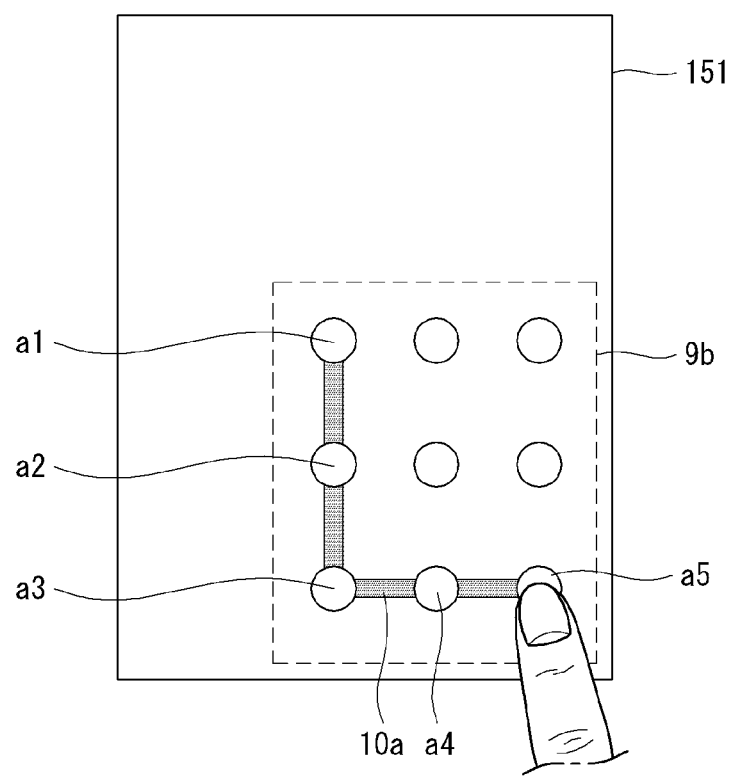
FIG. 10 shows an example of receiving an unlocking pattern using figures in the mobile terminal according to the first embodiment of the present invention.

FIG. 10 shows an example of receiving the unlocking pattern using figures.

Referring to FIG. 10, the controller 180 receives a pattern 10a corresponding to figures a1 to a5 touched by the user while the plurality of figures is displayed in the second area.

The pattern 10a can include the order of touching the figures a1 to a5 by the user or a trajectory formed by the touched figures a1 to a5.

The controller 180 compares the received pattern 10a with the previously stored unlocking pattern and unlocks the touch screen 151 when the two patterns correspond to each other.

As described above, according to the first embodiment of the present invention, it is possible to change the area in which the figures for receiving the unlocking pattern are displayed according to user input. Accordingly, the user can move the figures to a position at which the user conveniently inputs the unlocking pattern. Particularly, when the user has difficulty in inputting the unlocking pattern with one hand because the touch screen of the mobile terminal 100 is large, the user can move the figures to a position at which he/she can easily input the pattern, thereby improving user convenience.

While display positions of the figures are moved while the figures are displayed when an unlocking request for the specific mode is received from the user in the first embodiment of the present invention, the present invention is not limited thereto. According to exemplary embodiments of the present invention, the controller 180 can change the display positions of the figures using an additional screen for setting the display positions of the figures. In this case, the controller 180 displays the figures in an area set through the additional screen at the user's request for unlocking the specific mode.

Furthermore, while the display positions of the figures are changed using drag input in the first embodiment of the present invention, the present invention is not limited thereto. According to the present invention, the controller 180 can change the display positions of the figures on the basis of inputs in different forms, such as button manipulation, tapping, tilting of the mobile terminal 100, etc.

A method of controlling the mobile terminal 100 according to a second embodiment of the present invention and operations of the mobile terminal 100 to implement the control method will now be described with reference to FIGS. 11 to 15.

Figure 11:
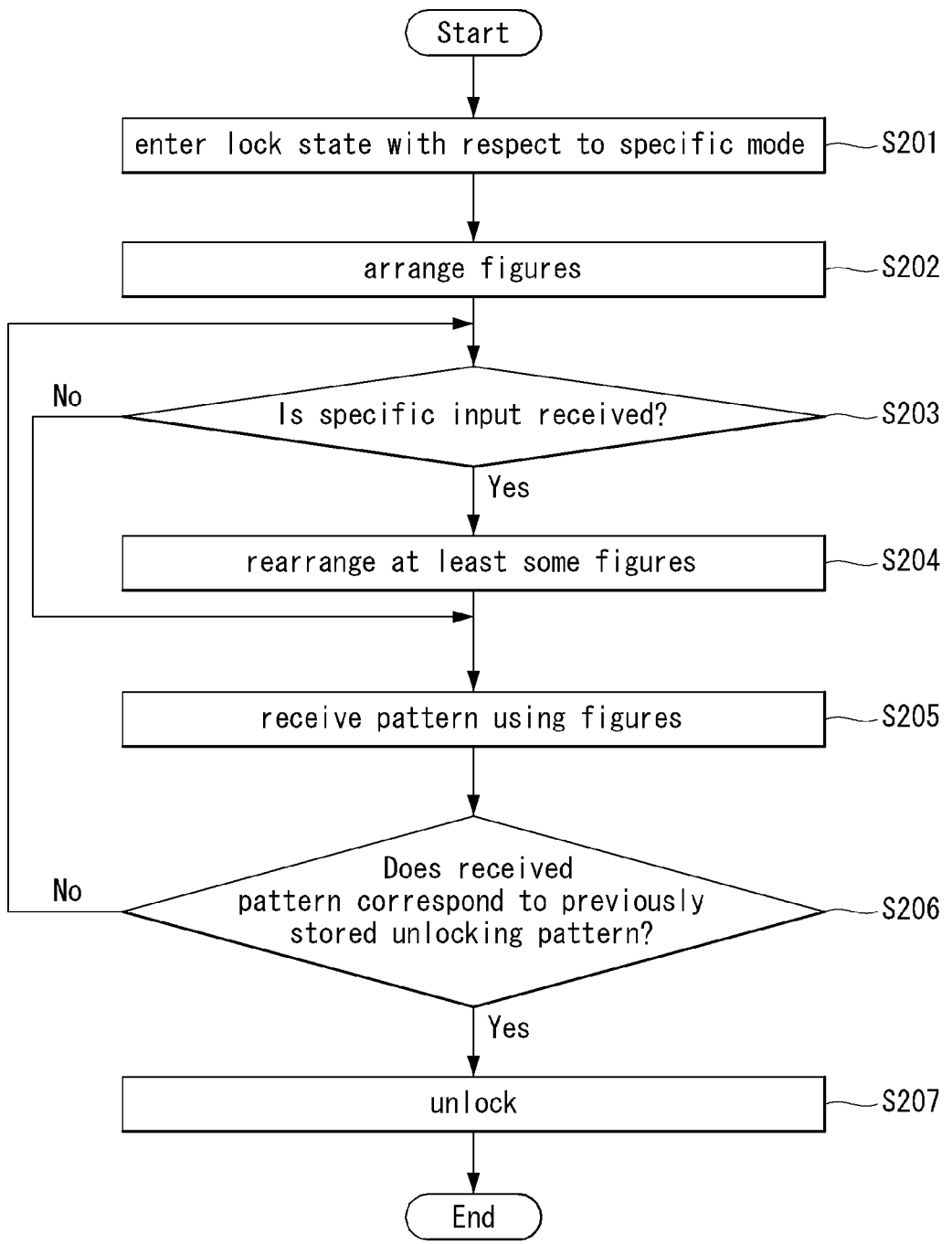
FIG. 11 is a flowchart illustrating a method of controlling the mobile terminal according to a second embodiment of the present invention.

FIG. 11 is a flowchart illustrating the method of controlling the mobile terminal 100 according to the second embodiment of the present invention and FIGS. 12 to 15 are views for explaining the control method shown in FIG. 11.

Referring to FIG. 11, the controller 180 locks a specific mode of the mobile terminal 100 (S201).

Upon reception of a control input for requesting the specific mode to be unlocked, the controller 180 arranges a plurality of figures for receiving an unlocking pattern (S202).

The controller 180 can display tridimensionality and arrange figures on the surface of the tridimensionality in step S202. In this case, the controller 180 can receive an unlocking pattern corresponding to a trajectory formed by some figures arranged on the surface of the tridimensionality or the order of touching the figures.

The controller 180 may combine the figures in the form of tridimensionality and display the figures in step S202. In this case, the controller 180 can receive the unlocking pattern corresponding to arrangement or arrangement positions of the figures.

When the controller 180 arranges the figures on the surface of the tridimensionality or combines the figures to display tridimensionality in step S202, it is possible to achieve 3-dimensional effect of the tridimensionality by controlling display characteristics such as shadow or acquire 3-dimensional effect of the tridimensionality using binocular parallax by activating the panel for producing stereoscopic vision.

Figure 12:
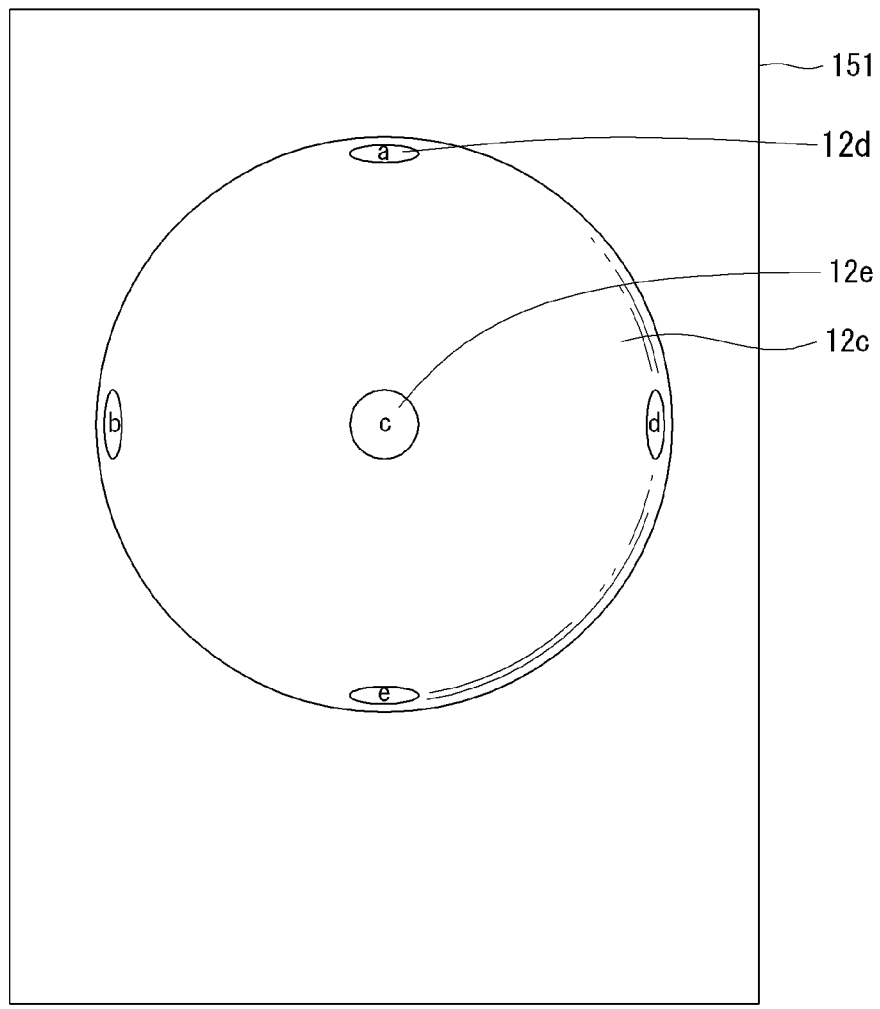
FIGS. 12 and 13 show examples of arranging figures used to receive an unlocking pattern in the mobile terminal according to the second embodiment of the present invention.
Figure 13:
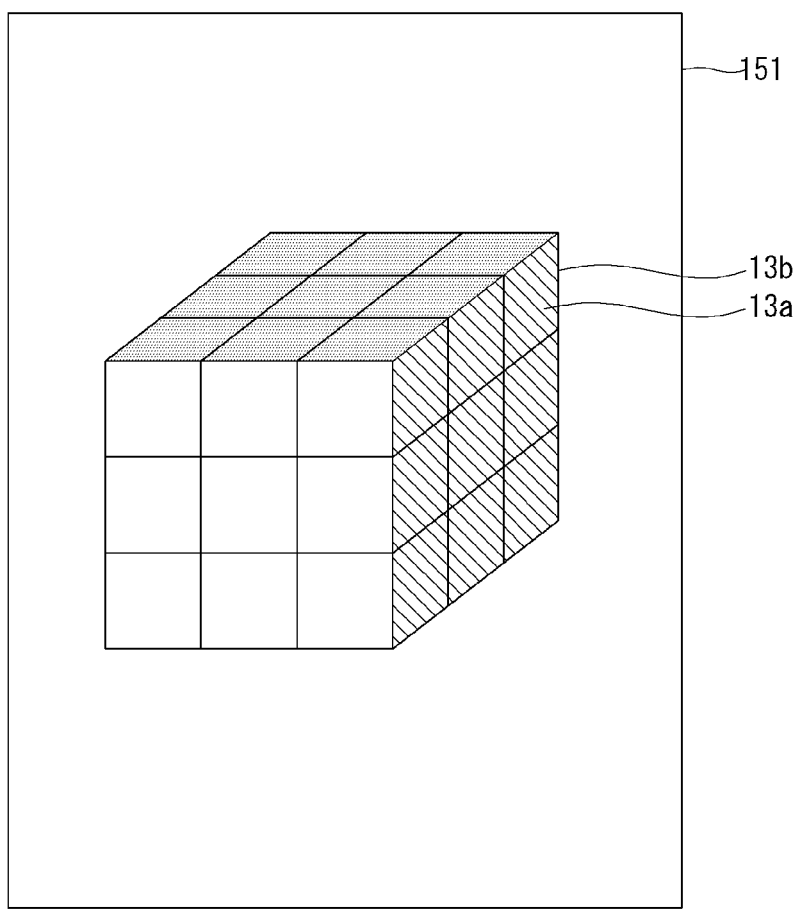

FIGS. 12 and 13 show examples of arranging the figures used to receive the unlocking pattern.

Referring to FIG. 12, the controller 180 displays a spherical tridimensionality 12c on the screen and arranges FIGS. 12d and 12e in the form of a dot on the surface of the tridimensionality 12c at a predetermined interval.

The spherical tridimensionality can be rotated and the composition of the figures displayed on the screen can be changed as the spherical tridimensionality rotates. That is, the surface of the sphere 12 displayed on the screen is changed when the sphere 12 rotates, and thus the composition of the figures displayed on the screen can be changed to correspond to the changed surface.

When the figures are arranged on the surface of the tridimensionality, the controller 180 may control a display characteristic such as color to be different for the respective figures or respectively allocating different identification information to the respective figures such that the figures can be distinguished even when the composition of the figures is changed according to rotation of the tridimensionality.

Referring to FIG. 12, the controller 180 displays different identification information on the respective figures such that the user can identify the figures even when the composition of the figures is changed.

Referring to FIG. 13, the user 180 uses cubic FIG. 13a in order to receive the unlocking pattern. The cubic FIG. 13a form a cube puzzle.

Figure groups respectively corresponding to rows or columns of the cube puzzle 13b can be rotated on a principle similar to the cube operation principle, and figures are rearranged as they rotate.

As shown in FIG. 13, when the figures are arranged in the form of a cube puzzle, a pattern of the colors of figures arranged on the front face of the cube puzzle can be used as the unlocking pattern. Accordingly, the controller 180 can divide the figures into a plurality of groups respectively corresponding different colors.

Referring back to FIG. 11, when a specific input is received while the figures for receiving the unlocking pattern are displayed (S203), the controller 180 rearranges at least some figures displayed on the screen (S204).

The specific input can be applied in various manners in step S203.

For example, the specific input can be applied through a touch gesture. In this case, the controller 180 can rearrange the figures displayed on the screen on the basis of a touch position on the screen, a drag direction, etc.

Furthermore, the specific input can be applied according to a motion of the mobile terminal 100. In this case, the controller 180 can rearrange the figures on the basis of the direction and degree of the motion of the mobile terminal 100.

When the figures are arranged on the surface of the tridimensionality, the controller 180 can rotate the tridimensionality on which the figures are arranged upon receiving the specific input in steps S203 and S204. Accordingly, the surface of the tridimensionality displayed on the screen is changed and the figures corresponding to the changed surface are displayed on the screen.

Furthermore, the controller 180 can change arrangement of the figures upon receiving the specific input in steps S203 and S204. That is, the controller 180 can change arrangement of at least some figures when the specific input is received.

Figure 14:
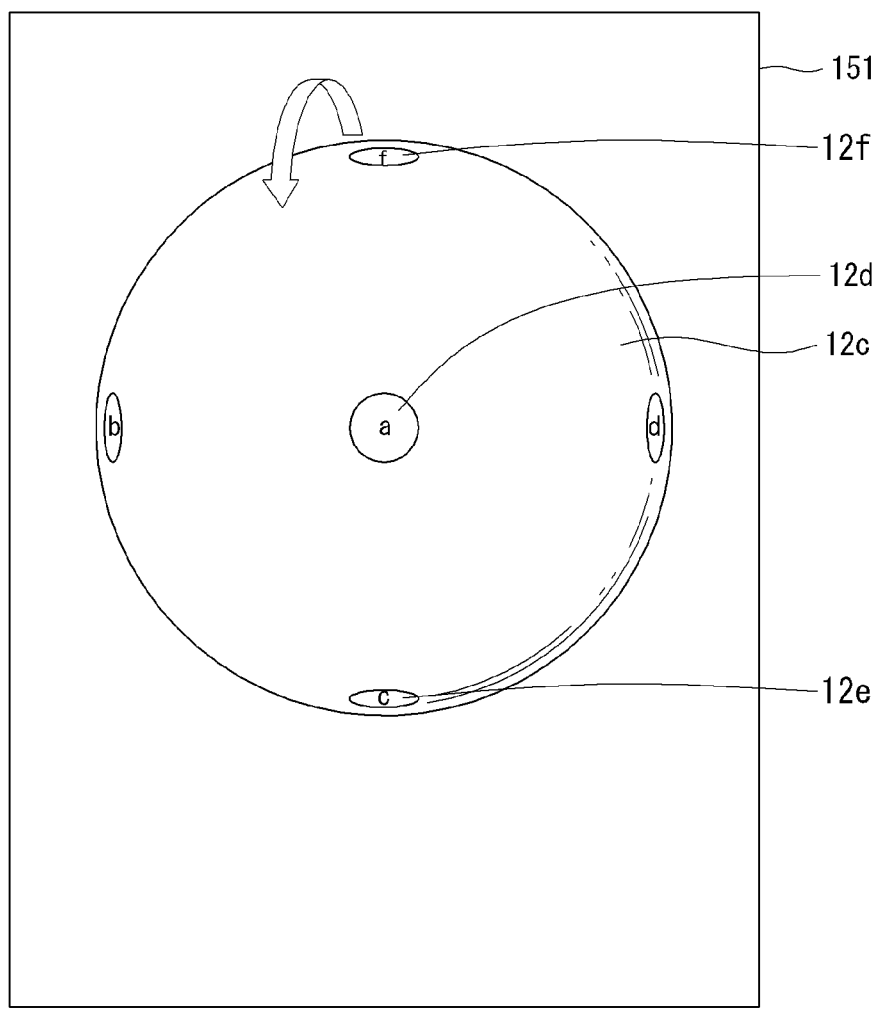
FIGS. 14 and 15 show examples of rearranging figures.
Figure 15:
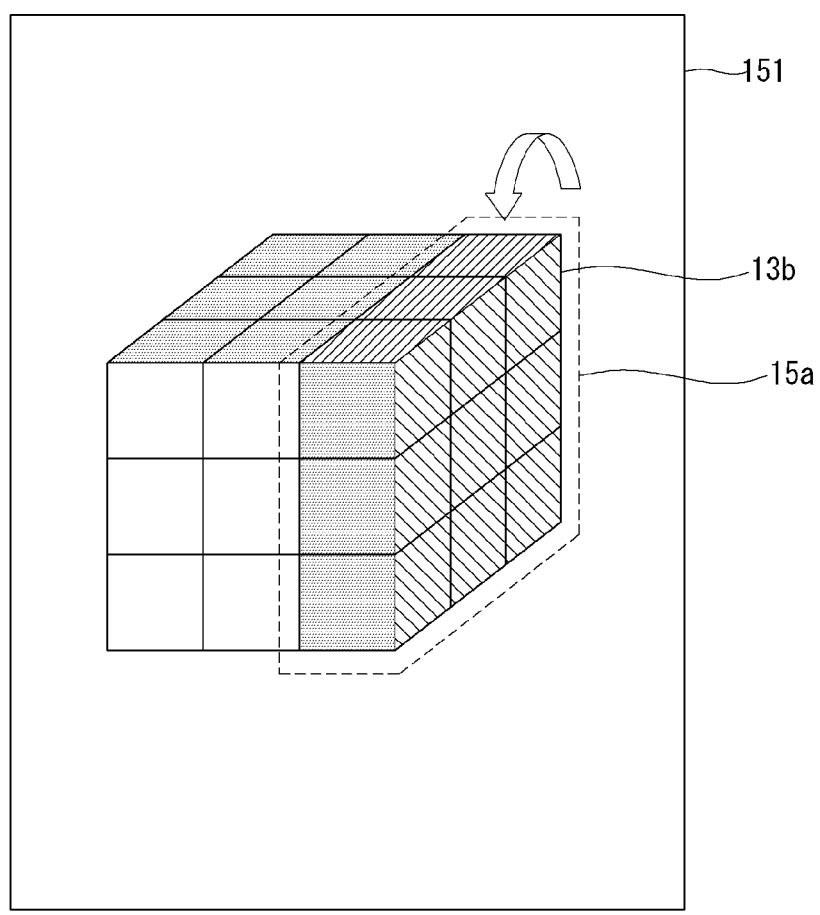

FIGS. 14 and 15 show examples of rearranging the figures.

Referring to FIG. 14, when the mobile terminal 100 tilts, the controller 180 rotates and displays the spherical tridimensionality 12c on the basis of the tilting direction, etc. When the area displayed on the screen is changed due to rotation of the tridimensionality, the controller 180 changes the composition of the figures displayed on the screen in response to the change of the area.

For example, the FIG. 12e represented by 'c' is arranged on the front face of the sphere 12c and the FIG. 12d represented by 'a' is arranged on the top face of the sphere 12c in FIG. 12, whereas the FIG. 12d represented by 'a' is located on the front face of the sphere 12d and the FIG. 12e represented by 'c' is arranged on the bottom face of the sphere 12c according to rotation of the tridimensionality in FIG. 14.

Referring to FIG. 15, when the cube puzzle 13a is dragged, the controller 180 rotates figures corresponding to a row 15a including touched figures in the cube puzzle 13a on the basis of the drag direction. Accordingly, figures arranged on the front face of the cube puzzle 13a are changed and a color pattern corresponding to the front face of the cube puzzle 13a is changed according to rearrangement of the figures on the front face of the cube puzzle 13a.

Referring back to FIG. 11, the controller 180 receives a pattern on the basis of user input applied to figures (S205). The controller 180 compares the received pattern with the previously stored unlocking pattern (S206), and unlocks the locked specific mode when the two patterns correspond to each other (S207). That is, the controller 180 controls the touch screen 151 to operate in the activation mode.

The controller 180 can receive the pattern on the basis of the order of touching figures displayed on the surface of the tridimensionality or a trajectory formed by the touched figures in step S205. In this case, the controller 180 can display the touched figures such that the touched figures are distinguished from other figures or display the trajectory formed by the touched figures such that the user can intuitively recognize the pattern input by him/her.

Furthermore, the controller 180 may receive the pattern on the basis of arrangement or arrangement positions of the figures in step S205.

According to the above-described second embodiment of the present invention, the mobile terminal 100 can rotate tridimensionality or change arrangement of figures three-dimensionally. Accordingly, the user can have fun inputting the unlocking pattern, compared to the case in which the user inputs the pattern using fixed figures.

A method of controlling the mobile terminal 100 according to a third embodiment of the present invention and operations of the mobile terminal 100 to implement the control method will now be described with reference to FIGS. 16 to 19.

Figure 16:
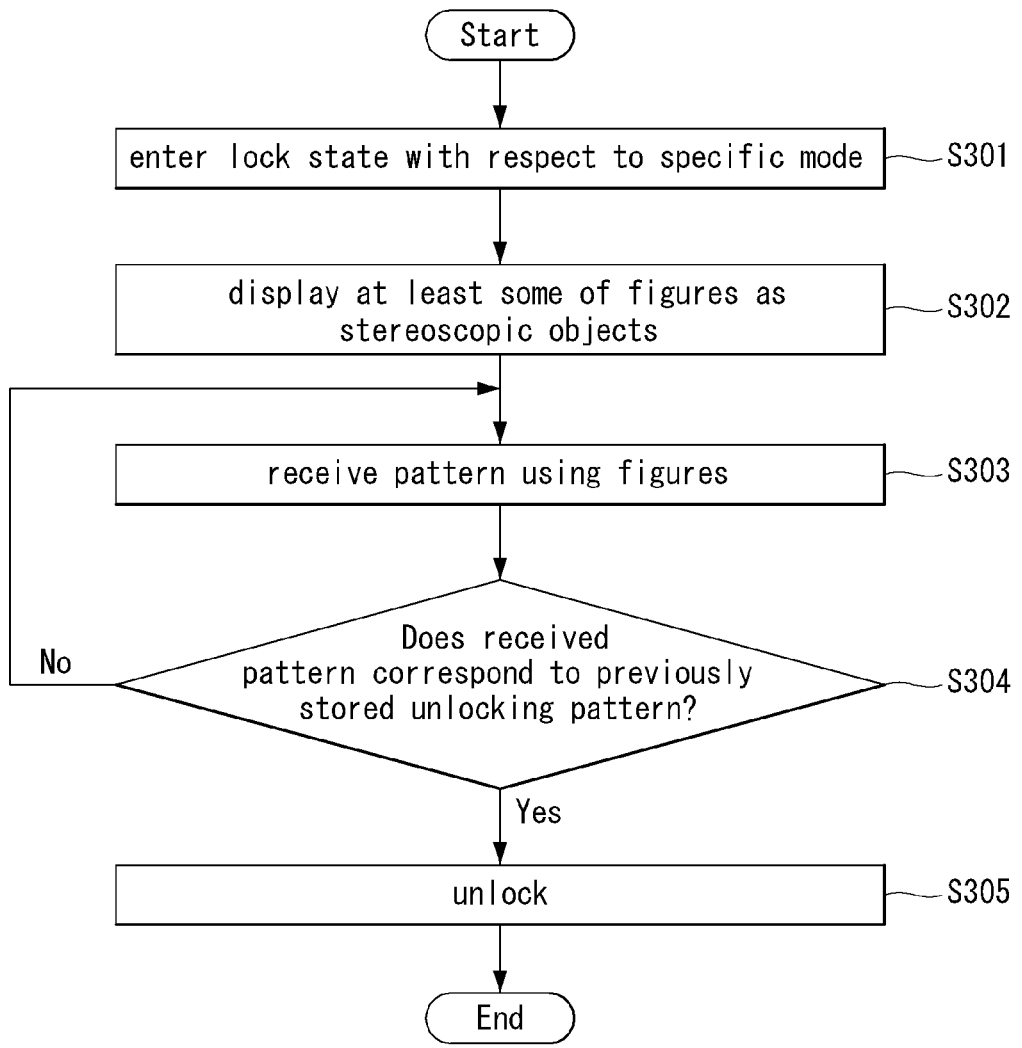
FIG. 16 is a flowchart illustrating a method of controlling the mobile terminal according to a third embodiment of the present invention.
Figure 17:
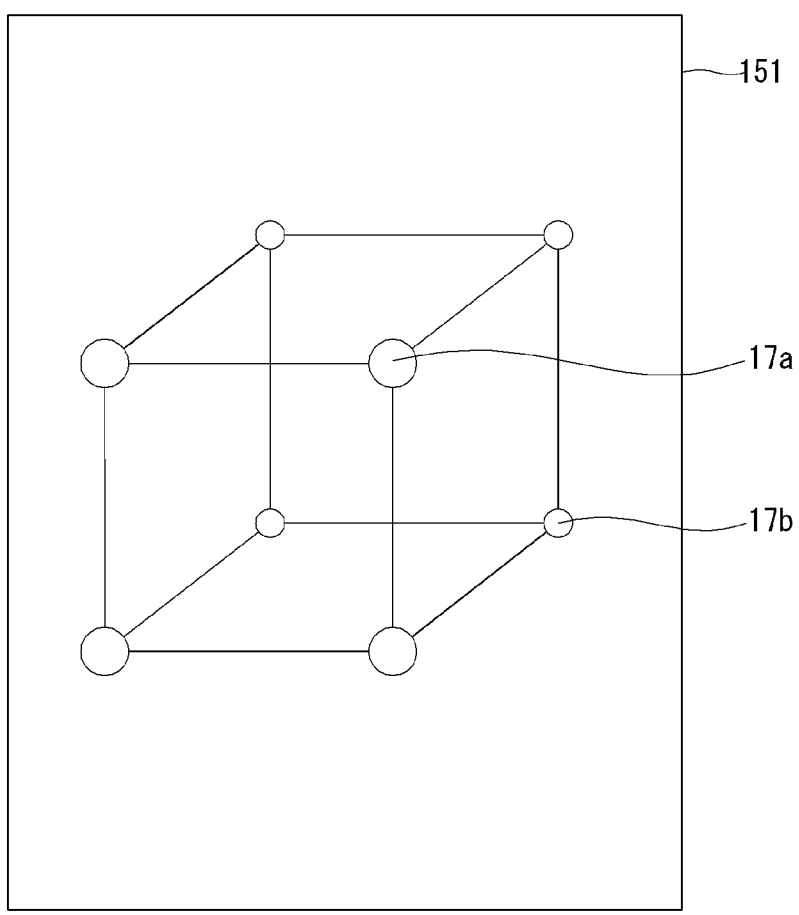
FIGS. 17 and 18 show examples of displaying figures as three-dimensional objects in the mobile terminal according to the third embodiment.
Figure 18:
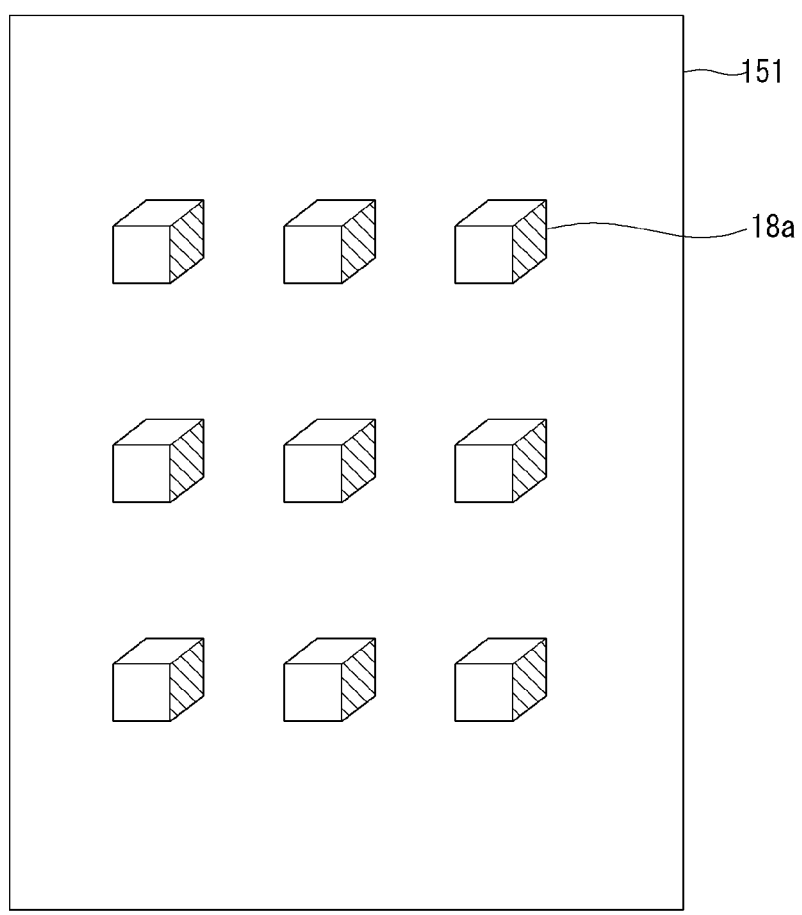
Figure 19:
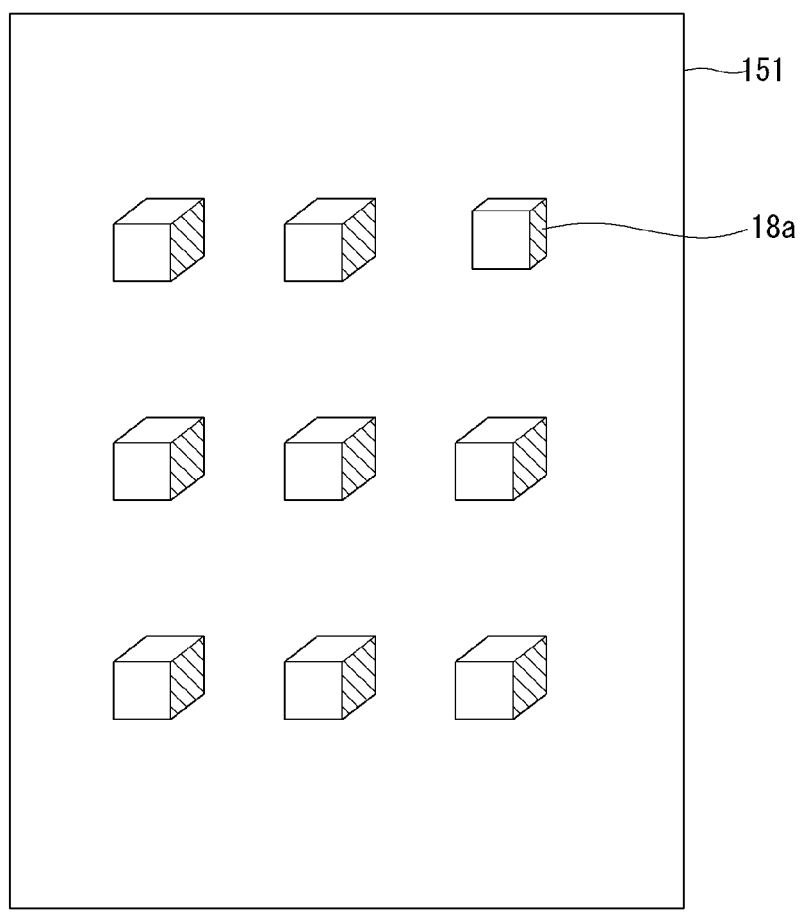
FIG. 19 shows an example of receiving a pattern using the figures shown in FIG. 18.

FIG. 16 is a flowchart illustrating the method of controlling the mobile terminal 100 according to the third embodiment of the present invention and FIGS. 17 to 19 are views for explaining the control method shown in FIG. 16.

Referring to FIG. 16, the controller 180 locks a specific mode of the mobile terminal 100 (S301).

Upon reception of a control input for requesting the specific mode to be unlocked, the controller 180 display a plurality of figures for receiving an unlocking pattern as stereoscopic objects (S302).

FIGS. 17 and 18 show examples of displaying the figures as stereoscopic objects.

Referring to FIG. 17, the controller 180 divides the plurality of figures into two groups and controls depths of the figures according to stereoscopic vision such that the groups have different depths. That is, the controller 180 controls the depths of the figures according to stereoscopic vision thereof such that one group is seen as if it is protruded from the display plane and the other is seen as if it is located on the display plane.

For example, the controller 180 can set the depth of FIG. 17a belonging to the first group such that the FIG. 17a are seen as if they are protruded from the display plane and set the depth of FIG. 17b belonging to the second group such that the FIG. 17b are seen as if they are located on the display plane.

Referring to FIG. 18, the controller 180 displays FIG. 18a in the form of a button on the display. The controller 180 sets the depth of the FIG. 18a according to stereoscopic vision thereof such that the figures are seen as if they are protruded from the display plane.

Referring back to FIG. 16, the controller 180 receives a pattern on the basis of proximity touch or contact touch input of the user, applied to some of the figures displayed on the screen (S303).

The controller 180 compares the received pattern with the previously stored unlocking pattern (S304) and unlocks the locked specific mode when the two patterns correspond to each other (S305). That is, the controller 180 controls the touch screen 151 to operate in the activation mode.

The controller 180 can receive the pattern according to contact touch or proximity touch on the basis of the depth of each figure according to stereoscopic vision thereof in step S303.

For example, when the figures are displayed in different depths, as shown in FIG. 17, the controller 180 can receive input on the basis of proximity touch for the FIG. 17a that are seen as if they are protruded from the display plane and receive input on the basis of contact touch for the FIG. 17b that are seen as if they are located on the display plane.

In this case, when some figures are touched according to contact touch or proximity touch, the controller 180 can receive the pattern corresponding to the trajectory generated on the basis of the order of touching the figures or the order of touching the figures.

Furthermore, when figures are displayed such that the figures are seen as if they are protruded from the display plane, as shown in FIG. 18, the controller 180 can receive input applied to the figures on the basis of contact touch.

In this case, the controller 180 can change the depth of the figures touched according to proximity touch and receive the pattern corresponding to the changed depth of the figures.

FIG. 19 shows an example of receiving the pattern using the figures shown in FIG. 18.

Referring to FIG. 19, when specific FIG. 18a are proximity-touched by the user, the controller 180 controls the depth of the FIG. 18a to be seen as if they are recessed as compared to other figures. In this manner, the controller 180 changes the depth of the FIG. 18a according to stereoscopic vision thereof and receives a pattern on the basis of the changed depth of the figures.

The controller 180 can permit each FIG. 18a to be repeatedly touched and control the depth of each FIG. 18a on the basis of the number or touches in stages. Furthermore, the controller 180 can change a degree by which the depth of each figure is changed according to touch methods.

For example, the controller 180 can control the depth of the FIG. 18a when the FIG. 18a is touched once to be seen deeper than the depth of the FIG. 18a when it is touched twice.

Furthermore, the controller 180 can control the depth of the FIG. 18a when the FIG. 19a is dragged to be seen deeper than the depth of the FIG. 18a when it is touched by tapping.

According to the third embodiment of the present invention, the unlocking pattern of the mobile terminal 100 is input using a stereoscopic object, and thus the user can experience stereoscopic vision as if he/she actually presses a button when inputting the unlocking pattern. Furthermore, it is possible to increase complexity of the unlocking pattern while minimizing complexity of unlocking pattern input process.

The above-described methods of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
a touch screen located on a first side of the mobile terminal;
a memory configured to store an unlocking pattern; and
a controller configured to:
cause the touch screen to display a first plurality of figures in a first area of the touch screen in a locked mode;
cause the touch screen to display a second plurality of figures in a second area of the touch screen in response to receiving a tapping input at the touch screen, wherein the tapping input is for rearranging the first plurality of figures, wherein the second area is located at a different location of the touch screen than the first area, wherein the displaying of the second plurality of figures occurs in the locked mode, and wherein a number of figures that define the first plurality of figures is same as a number of figures that define the second plurality of figures, and wherein the input at the touch screen is received after the first plurality of figures are displayed;
cause the touch screen to display a screen in an unlocked mode when a touch pattern received at the second area of the touch screen corresponds to the stored unlocking pattern, wherein the touch pattern is received at the second area after the second plurality of figures are displayed in the second area; and
cause the touch screen to display a screen in an unlocked mode when a touch pattern received at the first area of the touch screen corresponds to the stored unlocking pattern.

2. The mobile terminal of claim 1,
wherein the first plurality of figures are displayed in a row-column format in which adjacent figures within a row are located at a first interval distance relative to each other; and
wherein the second plurality of figures are displayed in a row-column format in which adjacent figures within a row are located at a second interval distance relative to each other, and
wherein the second interval distance is less than the first interval distance.

3. The mobile terminal of claim 1, wherein the controller is further configured to:
cause the touch screen to display the screen in the unlocked mode when the touch pattern is received at the second area in a particular order at particular figures of the second plurality of figures.

4. The mobile terminal of claim 1, wherein the touch pattern received at the second area represents a touch input received at particular figures of the second plurality of figures.

5. The mobile terminal of claim 1, wherein the touch pattern received at the second area represents a drag input received at two or more adjacent figures of the second plurality of figures.

6. The mobile terminal of claim 1, wherein the touch pattern received at the second area is a tapping.

7. The mobile terminal of claim 1, wherein the first plurality of figures are the same as the second plurality of figures.

8. The mobile terminal of claim 1, wherein the first plurality of figures are displayed in a row-column format, wherein an orientation of the row-column format of the second plurality of figures is the same as an orientation of the row-column format of the first plurality of figures.

9. An unlocking method for a mobile terminal having a touch screen, the method comprising:
displaying, on the touch screen, a first plurality of figures in a first area of the touch screen in a locked mode;
displaying, on the touch screen, a second plurality of figures in a second area of the touch screen in response to receiving a tapping input at the touch screen, wherein the tapping input is for rearranging the first plurality of figures, wherein the second area is located at a different location of the touch screen than the first area, wherein the displaying of the second plurality of figures occurs in the locked mode, and wherein a number of figures that define the first plurality of figures is same as a number of figures that define the second plurality of figures, and wherein the input at the touch screen is received after that the first plurality of figures are displayed;
displaying, on the touch screen, a screen in an unlocked mode when a touch pattern received at the second area of the touch screen corresponds to a stored unlocking pattern; and
displaying, on the touch screen, a screen in an unlocked mode when a touch pattern received at the first area of the touch screen corresponds to the stored unlocking pattern, wherein the touch pattern is received at the second area after the second plurality of figures are displayed in the second area.

10. The unlocking method of claim 9, wherein the first plurality of figures are displayed in a row-column format, wherein an orientation of the row-column format of the second plurality of figures is the same as an orientation of the row-column format of the first plurality of figures.

* * * * *